US005526359A

United States Patent [19]
Read et al.

[11] Patent Number: 5,526,359
[45] Date of Patent: *Jun. 11, 1996

[54] INTEGRATED MULTI-FABRIC DIGITAL CROSS-CONNECT TIMING ARCHITECTURE

[75] Inventors: E. Lawrence Read; Gary D. Hanson, both of Plano; Steven D. Sensel, The Colony; Richard Schroder, Plano, all of Tex.

[73] Assignee: DSC Communications Corporation, Plano, Tex.

[*] Notice: the term of this patent shall not extend beyond the expiration date of Pat. No. 5,436,890.

[21] Appl. No.: 176,125

[22] Filed: Dec. 30, 1993

[51] Int. Cl.$^6$ ......................................... H04J 3/06
[52] U.S. Cl. .................. 370/100.1; 370/58.2; 370/60.1; 370/84
[58] Field of Search ................ 370/100.1, 60.1, 370/108, 105.3, 103, 16, 84, 58.1, 58.2, 58.3, 94.1; 375/108, 118, 76

[56] References Cited

U.S. PATENT DOCUMENTS

| | | | |
|---|---|---|---|
| 4,941,141 | 7/1990 | Hayano | 370/100.1 |
| 4,967,405 | 10/1990 | Upp et al. | 370/58.1 |
| 5,115,425 | 5/1992 | Ardon | 370/58.1 |
| 5,142,529 | 8/1992 | Parruck et al. | 370/108 |
| 5,164,938 | 11/1992 | Jurkevich et al. | 370/84 |
| 5,175,639 | 12/1992 | Takasaki | 370/16 |
| 5,287,513 | 2/1994 | Ferguson | 370/100.1 |
| 5,289,138 | 2/1994 | Wang | 375/108 |
| 5,301,191 | 4/1994 | Otani | 370/84 |
| 5,303,078 | 4/1994 | Brackett et al. | 370/60.1 |
| 5,307,342 | 4/1994 | Georigiou et al. | 370/58.1 |
| 5,311,511 | 5/1994 | Reilly et al. | 375/118 |
| 5,365,518 | 11/1994 | Noser | 370/60.1 |
| 5,365,590 | 11/1994 | Brame | 370/58.1 |
| 5,436,890 | 7/1995 | Read et al. | 370/58.2 |

*Primary Examiner*—Douglas W. Olms
*Assistant Examiner*—Shick Hom
*Attorney, Agent, or Firm*—Baker & Botts

[57] ABSTRACT

A timing architecture for integrating broadband, wideband, and narrowband subsystems (14–18) employs a broadband time base (100) having a first frequency, a wideband time base (102) having a second frequency, and a narrowband time base (104) having a third frequency. The broadband, wideband and narrowband time bases (100–104) are independent from one another when the integrated subsystems (14–18) are not co-located. Frequency justification is provided at the interfaces between the broadband and wideband time bases (100, 102), and between the wideband and narrowband time bases (102, 104). Phase alignment circuitry and methods are used to adjust the phases of signals wherever signal multiplexing and redundant equipment switching are provided within the time bases (100–104).

51 Claims, 7 Drawing Sheets

INTEGRATED MULTI-FABRIC DIGITAL CROSS-CONNECT TIMING ARCHITECTURE

RELATED APPLICATION

This application is related to allowed application titled *Integrated Multi-Rate Cross-Connect System,* Ser. No. 08/176,548, now U.S. Pat. No. 5,436,890.

TECHNICAL FIELD OF THE INVENTION

This invention relates in general to the field of telecommunication systems. More particularly, the present invention relates to the timing architecture of an integrated multi-fabric digital cross-connect system.

BACKGROUND OF THE INVENTION

Digital cross-connect systems are an integral part of telecommunications transport network. They are increasingly used by all service providers including exchange carriers, long distance carriers, and competitive bypass carriers. Existing digital cross-connect system architectures generally have been based on a single core approach where all cross-connections are made through a single switching node or fabric. To handle layered signal structures used in today's transport networks, these single switching nodes have been connected in series.

Because new data, voice and imaging applications are causing a fundamental shift in the nature of network traffic, the network architecture is required to evolve to accommodate this change. Instead of being dominated by voice data, as in the past, the network traffic will increasingly carry bursty high-speed data transmissions. User applications and new network technologies including frame relay, switched multi-megabit data service and asynchronous transfer mode (ATM) are driving the transport network toward the synchronous optical network or SONET. SONET is a new transport medium, designed to enable midspan meets between central office switching systems. It defines optical signals and a synchronous frame structure for multiplexed traffic as well as for operations and maintenance procedures.

SONET brings a multi-dimensional increase in network complexities. There is a wide variety of signal formats that are embedded in new broadband and wideband structures such as synchronous payload envelopes (SPEs). DS1 signals provide the primary transport rate for North America. DS1 frames are capable of carrying twenty-four DS0 (64 kbs) voice or data channels. DS1 signals can be mapped in the new SONET STS-1 SPEs in a number of ways. 1) The DS1 signals can be multiplexed into DS3 frames via M1/3 multiplexers and the DS3 signals can be asynchronously mapped into the STS-1 SPE. 2) The DS1 signals can be synchronously or asynchronously mapped into floating VT1.5 payloads and the VT1.5 signals can be multiplexed in the STS-1 SPE. 3) The DS1 signals can be mapped into Locked VT1.5 payloads and the Locked VT1.5 signals can be multiplexed into the STS-1 SPE. However, these approaches create three incompatible wideband structures, which must be individually groomed, multiplexed and switched to assure end-to-end signal integrity. This analysis brings to light the fact that networks can no longer deliver traffic transparently. Because the networks have to recognize different payloads to deliver traffic intact between users, the digital cross-connect system must be able to handle all three formats equally well.

Accordingly, advantages have been recognized for a digital cross-connect system that integrates narrowband, wideband and broadband subsystems to route and manipulate circuit as well as cell-based traffic. To accomplish this task, a unique timing architecture is realized to accommodate a distributed hardware architecture that employs separate timing reference signals and to achieve frequency justification and phase alignment of data signals at certain timing interfaces.

SUMMARY OF THE INVENTION

In accordance with the present invention, a timing architecture and method for an integrated multi-fabric cross-connect system are provided.

In one aspect of the present invention, a timing architecture for integrating broadband, wideband, and narrowband subsystems employs a broadband time base having a first frequency, a wideband time base having a second frequency, and a narrowband time base having a third frequency. The broadband, wideband and narrowband time bases are independent from one another when the integrated fabrics are not co-located but are linked with long-distance optical links. Frequency justification is provided at the interfaces between the broadband and wideband time bases, and between the wideband and narrowband time bases. Phase alignment circuitry and methods are used to adjust the phases of signals wherever signal multiplexing and redundant equipment switching are performed within the time bases.

The boundaries between the broadband, wideband, and narrowband time bases are selected to minimize circuit complexity and SONET pointer processing when adjusting the frequencies between the time bases. Phase alignment at selected points are achieved by using buffering and servoing. The servoing technique greatly reduces the depth of buffering required to achieve phase alignment.

In another aspect of the present invention, a method for timing integrated broadband, wideband, and narrowband subsystems comprises the steps of operating the broadband subsystem at a first frequency, the wideband subsystem at a second frequency, and the narrowband subsystem at a third frequency. The three frequencies thus comprise three independent time bases with the boundaries chosen to facilitate frequency justification therebetween. Phase alignment within the time bases is also performed so that signal multiplexing and redundant equipment switching may be achieved.

BRIEF DESCRIPTION OF THE DRAWINGS

For a better understanding of the present invention, reference may be made to the accompanying drawings, in which.

DETAILED DESCRIPTION OF THE INVENTION

The preferred embodiment of the present invention and its advantages are best understood by referring to FIGS. 1–7 of the drawings, like numerals being used for like and corresponding parts of the various drawings.

I. Hardware Architecture

Figure 1:
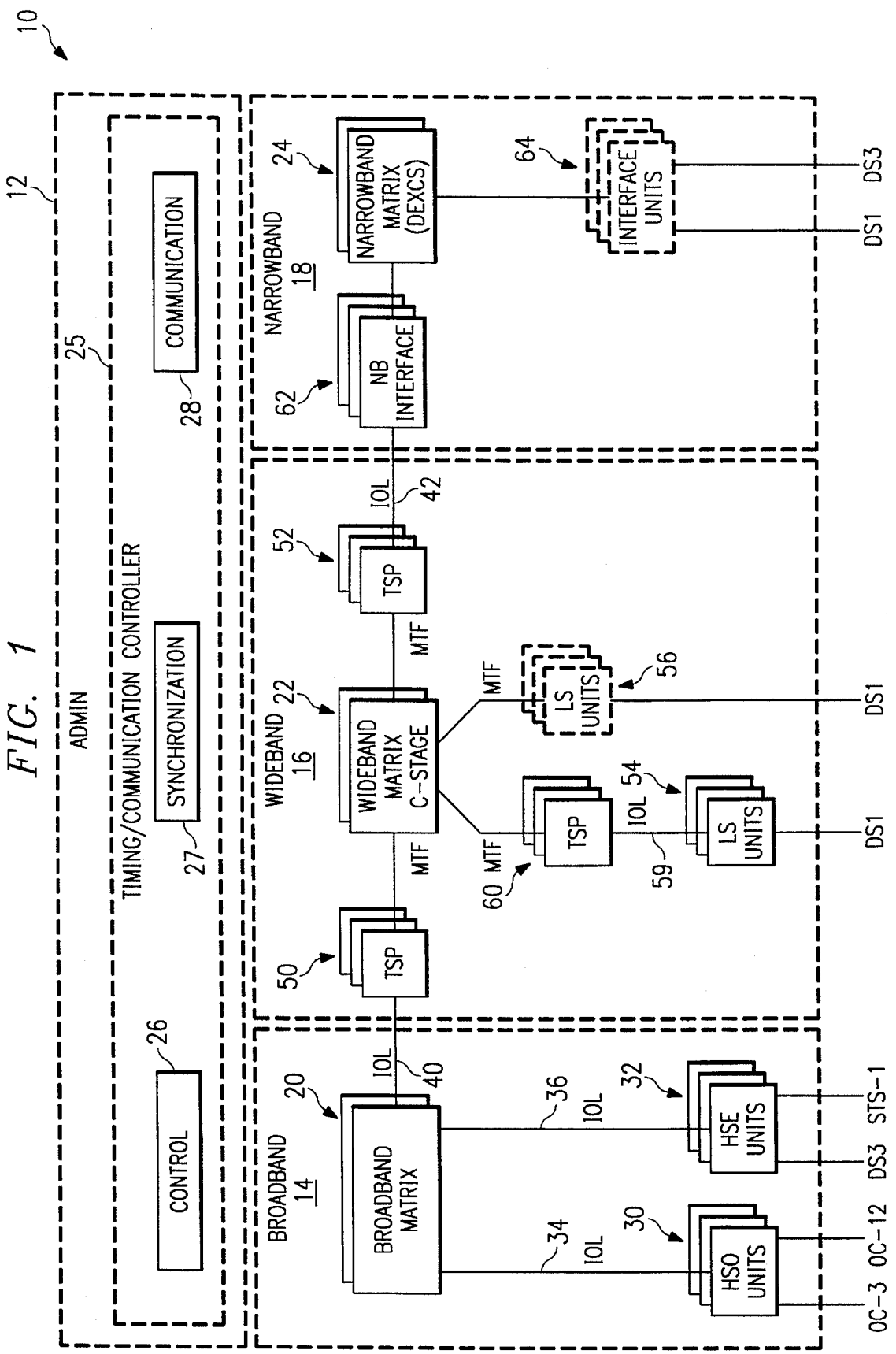
FIG. 1 is a high level block diagram of an embodiment of the integrated multi-fabric digital cross-connect system hardware architecture.

Referring to FIG. 1, a high level hardware architecture block diagram of an integrated multi-fabric digital cross-connect system 10 is shown. Integrated multi-fabric digital cross-connect system 10 includes an administration and control subsystem 12, which provides alarming processing and provisioning, craft access, timing and communication controls, and like administrative functions for system 10. Administration and control subsystem 12 includes separate and independent timing subsystems for cross-connect matrices 20–24 if they are not located in close proximity with one another. When not co-located, an independent time base is provided for each broadband 14, wideband 16, and narrowband subsystem 18.

Administration and control subsystem 12 includes a timing/communication controller 25 which comprises three units: control 26, synchronization 27, and communication 28. If cross-connect subsystems 14–18 are co-located, such as in a small system with the subsystems located in close proximity with one another, a common timing/communication controller 25 may be used. If subsystems 14–18 are not co-located, a separate timing/communication controller 25 providing separate and independent timing reference signals to each subsystem 14–18 is used. This timing scheme creates a unique timing architecture where three time bases are employed within one integrated system 10. Therefore, frequency justification and phase alignment at time base boundaries and other points in the system are addressed.

Administration and control subsystem 12 is coupled to broadband, wideband, and narrowband subsystems 14–18 via standard communication interfaces or optical links for longer distances. The optical links in system 10 have been termed integrated office links or IOLs, and may be referred to as such hereinafter. Each broadband, wideband, and narrowband subsystems 14–18 includes a separate matrix 20–24 for signal cross-connection at each level. Broadband matrix 20 may be of a non-blocking three stage space architecture switching signals preferably at the STS-1 rate. Wideband matrix 22 may also be of the three stage space architecture switching signals at the VT1.5 or VT2 rate. Additionally, both matrices 20 and 22 may use multiple matrix channels to switch higher rate signals at STS-3C and VT3 rates, respectively. Narrowband matrix 24 provides redundant non-blocking dual-time slot interchange matrix planes to cross-connect signals at lower rates, including DS0. Both North American and European rates and formats are supported. System 10 supports asynchronous terminations at the DS1 and DS3 rates and synchronous SONET terminations at the STS-1 and OC-N rates including OC-3 and OC-12.

Broadband matrix 20 is also coupled to associated high speed optical (HSO) and electrical (HSE) unit shelves 30 and 32 using optical integrated office links (IOLs) 34 and 36, respectively. Signals transported on IOLs are preferably in standard OC-12 frame format with some modified use of the overhead fields to carry proprietary signals used for internal fault coverage, communication channels, a superframe indicator signal, and information associated with network terminations. Each IOL carries twelve STS-1-like (STS-1P) signals and a number of nonstandard overhead signals. STS-1P frames have the same nominal frequency and frame structure as the standard STS-1 signals with certain section and line overhead fields used in a proprietary manner. Each IOL has been defined in system 10 to have up to a maximum of two kilometers in length. The long-distance capability of the IOLs provides flexibility in the physical arrangement of the bays to achieve a variety of floor plans and minimize installation and calling costs.

As shown, OC-N signals including OC-3 and OC-12 signals are line terminated in high speed optical units 30 coupled to broadband matrix 20 via IOL 34. Full electrical STS-1 and DS3 line termination is provided at high speed electrical unit 32. Network signals are cross-connected through broadband matrix 20 at the STS-1 rate. STS-1 synchronous payload envelopes (SPEs) associated with OC-N or electrical STS-1 signals are cross-connected in STS-1P frames locked to the broadband time base. DS3 cross-connection is done by asynchronously mapping DS3 signals into STS-1 SPE signals in accordance with the SONET standard, which are then mapped into STS-1P frames.

Broadband matrix 20 is further coupled to wideband subsystem 16 via an optical link (IOL) 40. Wideband subsystem 16 is coupled to narrowband subsystem 18 via another optical link 42. As discussed above, optical links (IOL) 34, 36, 40, and 42 may be up to two kilometers in length and is adapted for carrying twelve STS-1P payloads and other overhead signals used for maintenance, control, and fault coverage. Bidirectional traffic on optical links IOLs 34, 36, 40, and 42 are in standard OC-12 frame format.

Broadband matrix 20 is coupled to wideband matrix 22 through an interface unit or tributary signal processors (TSP) 50. Tributary signal processors 52 also act as interfaces between wideband matrix 22 and narrowband subsystem 18, and between wideband matrix 22 and low speed (LS) units 54. Tributary signal processors 50–54 play important roles in the timing architecture of integrated multi-fabric digital cross-connect system 10, details of which are described below.

Wideband subsystem 16 supports line terminations including DS1 and European 2048 KHz or E1 signals. Higher rate network signals, including DS3 and STS-1, may access wideband subsystem 16 through broadband subsystem 14. DS1 termination is performed at remote and/or local low speed unit subsystems 54 and 56, where remote low speed unit 54 is coupled to wideband matrix via an IOL 58 through another tributary signal processor 60. Wideband signals are cross-connected in modified synchronous channels that contain nonstandard a payload envelope capable of carrying a VT2 signal. Asynchronous signals such as DS1, E1 and VT signals are mapped into the wideband modified channels for internal nonstandard transport and cross-connection. E1, DS1C and DS2 gateways and asynchronous cross-connections are provided by mapping the signals into VT2, VT3, and VT6 payload envelopes, respectively, using the standard SONET mapping specifications. The matrix transport format (MTF) signals contain 28 channels, each of which is capable of carrying a VT2 payload. As shown in FIG. 1, signal traffic between wideband matrix 22 and tributary signal processors 50, 52, and 60, and low speed units 56, and conversion unit 59 are all in the matrix transport format. For a more detailed description of the matrix transport format, please refer to co-pending application titled *Integrated Multi-Rate Cross-Connect System* (Ser. No. 08/176,548), incorporated herein by reference.

Narrowband matrix 24 is coupled to wideband subsystem 16 through a narrowband interface unit 62. Cross-connect interface units 64 coupled to narrowband matrix 24 provide electrical termination of signals at rates that include the DS1 and DS3 bandwidths. Narrowband subsystem 18 is generally arranged to access network traffic through wideband subsystem 16. Lower rate signals, including DS0, are cross-connected by narrowband matrix 24. For a more detailed description of integrated multi-fabric digital cross-connect system hardware architecture, please refer to co-pending application titled *Integrated Multi-Rate Cross-Connect System*, (Ser. No. 08/176,548).

II. Timing Architecture

Figure 2:
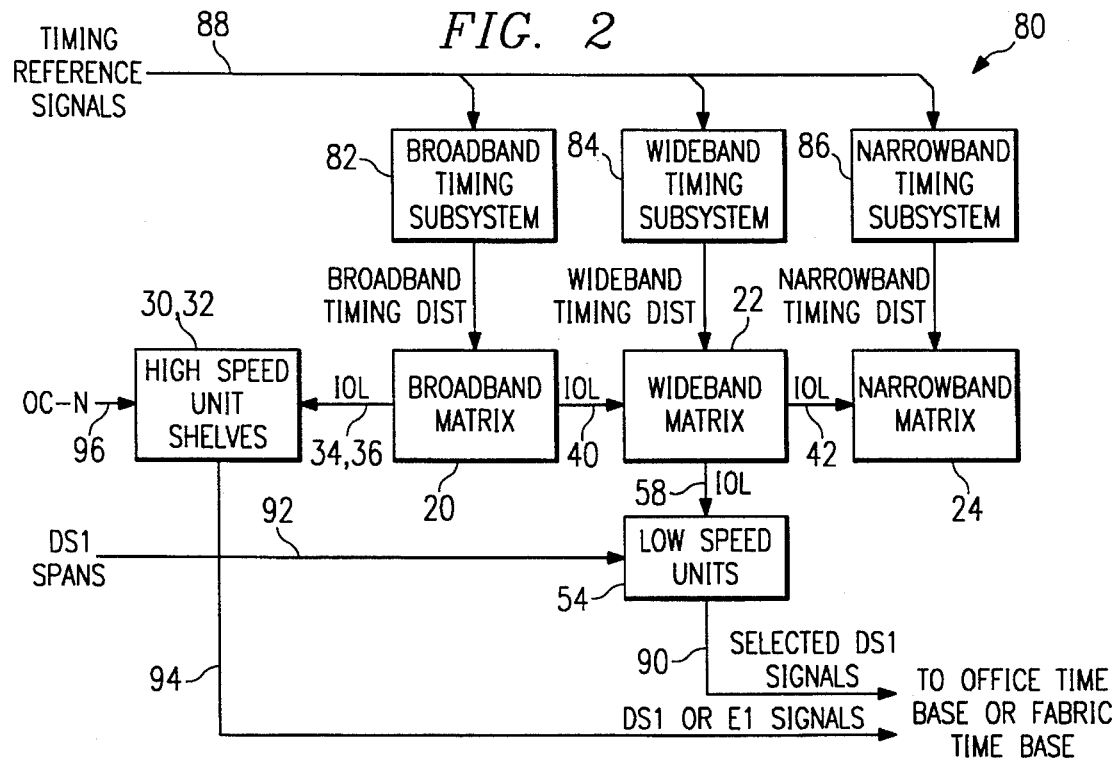
FIG. 2 is a simplified block diagram showing synchronization and timing distribution.

Referring to FIG. 2, the timing distribution scheme 80 of integrated multi-fabric digital cross-connect system 10 is shown. As discussed above, when broadband, wideband, and narrowband subsystems 14–18 are not co-located, independent respective timing subsystems 82–86 located in timing/communication controller 25 (FIG. 1) are provided. Each timing subsystem 82–86 includes an independent stratum-level clock. The stratum-level clock may be a stratum 3E or stratum 3 voltage controlled oscillator (not shown) or better. The stratum-level voltage controlled oscillator may be locked onto an external source, or may rely on some known storage technique to sustain accuracy with respect to the last known frequency content of an external reference (holdover operation mode). External references typically have traceability back to a primary reference source, including DS1, OC-N, 64/8 kb/s composite clock, 2.048 MHz Loran, and E1 signal types.

Broadband, wideband, and narrowband timing subsystems 82–86 are locked onto a selected one of a pair of office timing reference signals 88 that are distributed to each subsystem. Two sets of timing reference signals 88 are supplied to provide redundancy and the capability to switch therebetween upon failures. Office timing reference signals 88 may be sourced by a pair of office timing supplies (BITS). Alternatively, office timing reference signals 88 may be derived from signals received from the network, such as a selected DS1 signal 90 generated in low speed units 54 from DS1 spans 92, or DS1 and E1 signals 94 generated in high speed unit shelves 30 and 32 from received optical signals 96, such as OC-3 or OC-12 signals as described above. Normally all broadband, wideband, and narrowband subsystems 14–18 operate synchronously with one another at a frequency traceable to the same source. However, frequency justification between the subsystems becomes necessary when one or more subsystems is running in the holdover mode or experiences some timing anomaly.

Each fabric timing subsystem 82–86 generates timing signals based on the selected office timing reference signals 88 and distributes them to the matrix of the associated fabric. The derived timing signals are further tested and hierarchically distributed to the subsystems in each subsystem 14–18 through matrices 20–24.

Figure 3:
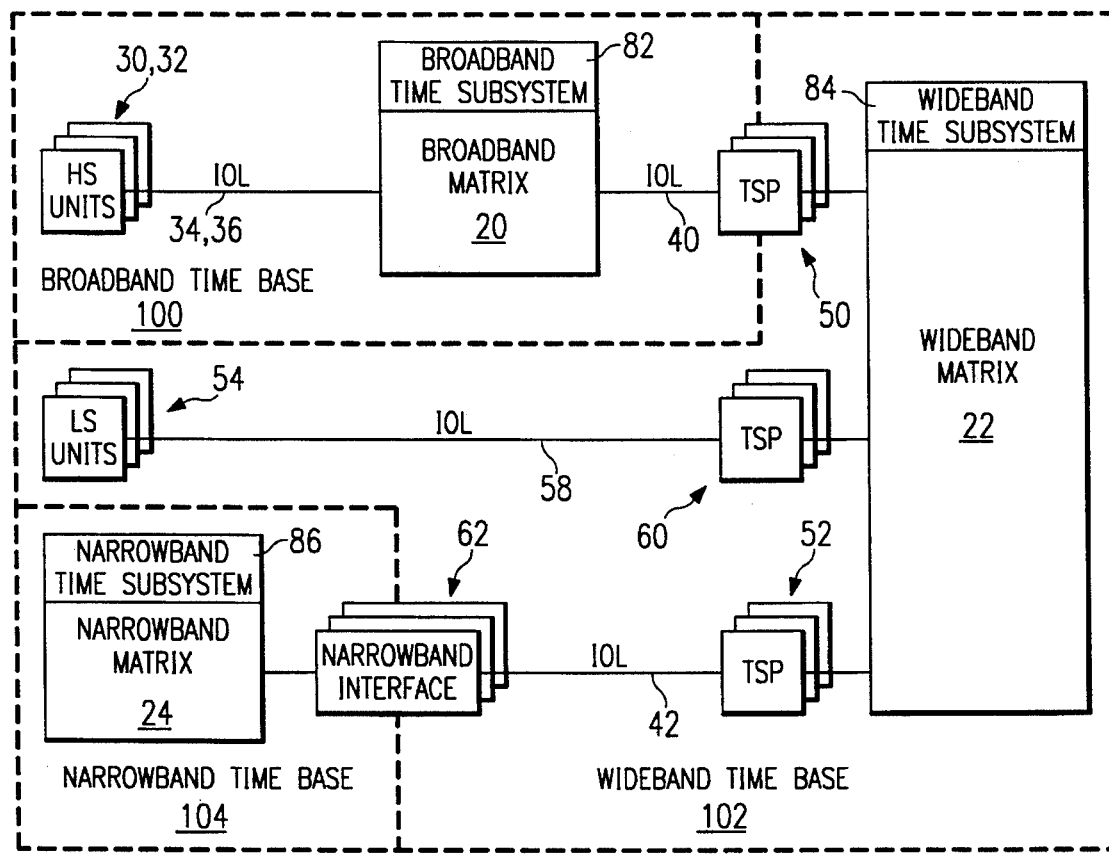
FIG. 3 is a simplified block diagram illustrating the concept of timing islands.

Referring to FIG. 3, the concept of independent broadband, wideband, and narrowband time bases 100–104 in integrated multi-fabric digital cross-connect system 10 is shown. Since broadband, wideband, and narrowband subsystems 14–18 operate with independent timing subsystems 82–86, frequency justification is needed at the boundaries between time bases 100–104 associated with each fabric. Time bases 100–104 are not physical entities; they merely serve to illustrate the boundary surrounding the system components operating under the different timing subsystems 82–86. As described above, timing information and signals are hierarchically distributed from broadband and wideband matrices 20 and 22 to the end points of their respective time bases.

As shown, broadband time base 100 encompasses high speed units 30 and 32, broadband matrix 20, and optical links 34, 36, and 40. Frequency justification between broadband time base 100 and wideband time base 102 is performed in tributary signal processor 50 located in wideband subsystem 16. Wideband time base 102 encompasses tributary signal processors 52 and 60, low speed units 54, and optical links 58 and 42, where frequency justification between wideband and narrowband time bases 102 and 104 is performed in narrowband interface subsystem 62. Time base boundaries, and hence the site of frequency justification, are selected to minimize circuit complexities and SONET pointer movements when traversing from one time base to the next. For example in the inbound direction, the boundary between broadband and wideband time bases 100 and 102 for DS3 mapped STS-1 SPEs is where STS-1 path is terminated. By selecting this point as the boundary, additional pointer movement for timing justification is avoided. A more detailed description of the data flow and frequency justification is set forth below.

Figure 4:
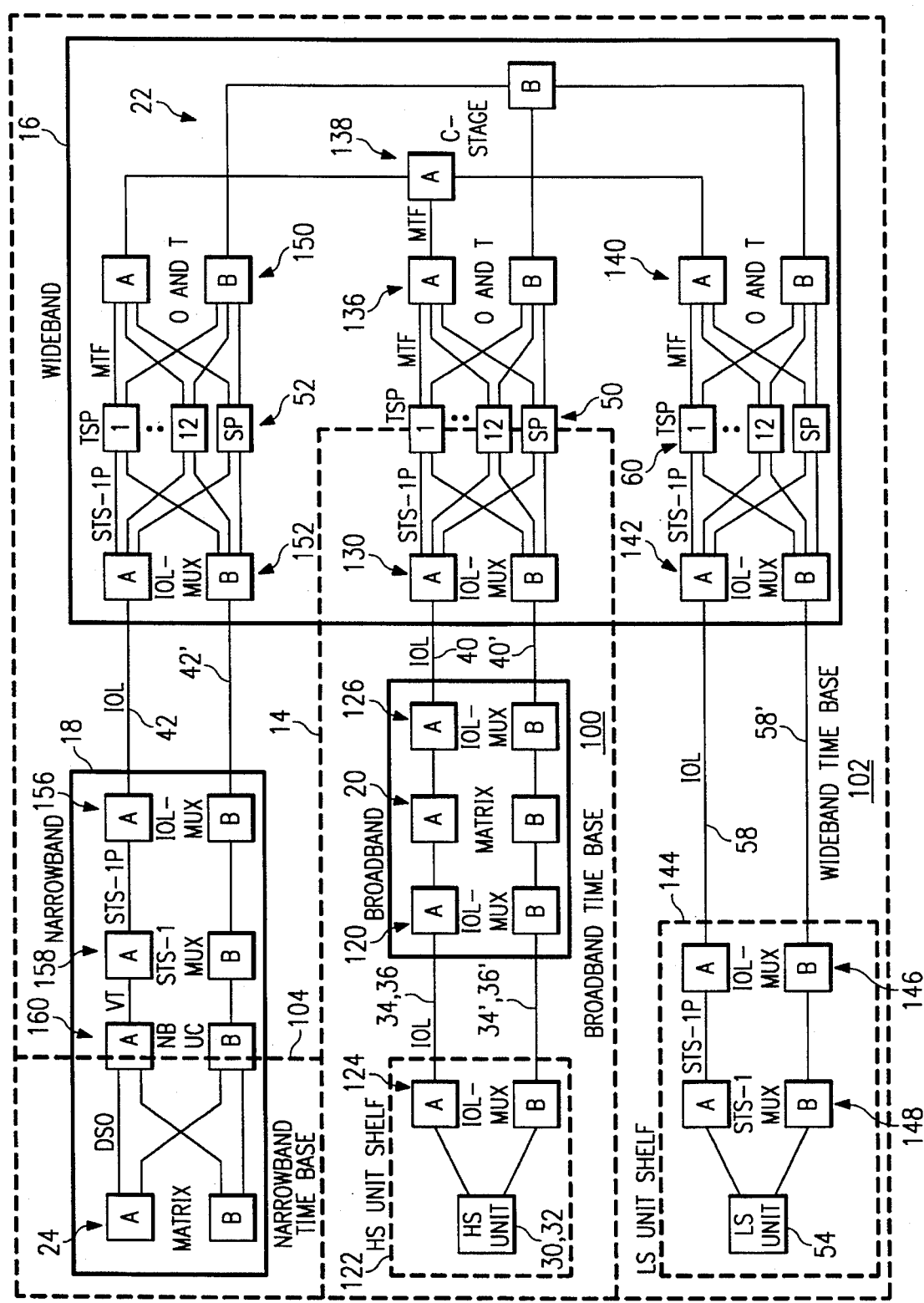
FIG. 4 is a block diagram of the separate time bases and interfaces therebetween at which phase alignment is instituted.

Referring to FIG. 4, a simplified block diagram of time bases 100–104 and the various points in system 10 where phase alignment is performed is shown. Redundancy in system 10 is indicated by the A and B designations of redundant elements. Briefly, the system elements shown in FIG. 4 for each subsystem 14–18 are described. In broadband subsystem 14, an A copy of matrix 20 is coupled to an A copy of an IOL-MUX 120 for connection and signal demultiplexing onto IOL 34 (or 36) to an A copy of IOL-MUX 124 in a high speed (HS) unit shelf 122. High speed unit shelf 122 may include either high speed optical unit 30 or high speed electrical unit 32 or both units. Similarly, a B copy of matrix 20 is coupled to a B copy of IOL-MUX 124 in high speed unit shelf 122 through a B copy of IOL-MUX 120 via IOL 34' or 36'. The A and B copies of matrix 24 are also coupled to A and B copies of IOL-MUX 126 for IOL connection to associated A and B copies of IOL-MUX 130 in wideband subsystem 16.

A and B copies of IOL-MUX 130 in wideband subsystem 16 demultiplex the twelve STS-1P signals carried on each IOL and provide them to twelve copies of tributary signal processors 50. As shown, there is an additional spare tributary signal processor (SP) provided for redundancy and backup. Tributary signal processors 50 are then coupled to A and B copies of the originating and terminating stages 136 of three-stage wideband matrix 22. Similarly, matrix 22 includes A and B copies of a center stage 138 which are also coupled accordingly to associated A and B copies of originating and terminating stages 140 and 150.

Originating and terminating stage 140 copies are coupled to tributary signal processors 60 and IOL-MUX A and B copies 142, which provide connection and signal multiplexing to low speed unit shelf 144 via IOL 58 and 58'. In the configuration shown in FIG. 4, low speed unit shelf is arranged as a remote equipment, which necessitates the use of IOLs and IOL-MUXs 142 and 146. Coupled to IOL-MUX copies 146 are STS-1 MUX copies 148, which are then coupled to low speed unit 54.

Wideband originating and terminating stage copies 150 are coupled to narrowband subsystem 18 via tributary signal processors 52, IOL-MUX copies 152, IOL 42 and 42' and IOL-MUX copies 156. The narrowband subsystem further includes STS-1 MUX copies 158 coupled to respective copies of IOL-MUX 156, and respective copies of a narrowband unit controller (UC) 160 which serves as an interface unit between narrowband subsystem 18 and wideband subsystem 16.

When connecting wideband subsystem 16 to a broadband subsystem 14, the associated IOL 40 and 40' is part of broadband time base 100. Signals transmitted from wideband tributary signal processors 50 to IOL-MUX 130 are loop-timed to IOL signals received from broadband subsystem 14. Therefore, the timing scheme for IOL-MUX 130 is derived from the data on IOL 40 and 40' received from broadband matrix 20. The frame phase of the IOL signal transmitted to broadband matrix 20 is offset from the phase of the received IOL signal using the servo mechanism, to be described below.

Within each time base 100–104, all signals have a common frequency but are not necessarily phase aligned. Phase skew is primarily caused by different propagation delays due to variations in cable lengths. Phase alignment of associated signals are needed where signal multiplexing is performed. Additionally, where redundant equipment of plane switching is permitted, phase alignment of parallel redundant data is required to ensure error-free switching. The error-free switching process may include detecting a performance deterioration, and deselecting the current active plane and selecting the other plane simultaneously.

When SONET signals cross time base boundaries, SONET pointer processing circuitry and techniques as known in the art is used internally within system 10 to change from one frequency to the next when data traverses time base boundaries. Pointer processing provides a method of allowing flexible and dynamic alignment of the payloads within the STS-1P containers independent of the actual contents of the containers. Generally, the beginning of the payload is referenced by a pointer but the payload itself is allowed to "float" within the container. If there is a frequency offset between the frame rates, the pointer value is incremented or decremented as needed, accompanied by a corresponding positive or negative stuff byte or bits. In this manner, frequency justification between time bases is accomplished. A more detailed discussion of pointer processing circuitry and techniques may be found by referring to American National Standard T1.105, section 9 on *Payload Pointers;* CCITT Recommendation G.709, section 3 on *Pointers;* and Bellcore document TR-NWT-000253, section 3.5 on *Payload Pointers,* all of which are incorporated herein by reference.

In addition to frequency justification, phase alignment must also be achieved at numerous points in integrated multi-fabric digital cross-connect system 10. Phase skew within a time base is mainly introduced by variations in propagation delay between redundant systems. For example, since IOLs 58 and 58' carrying data, overhead, and timing information between tributary signal processors 60 and low speed unit shelves 144 may differ in length, the phases of the information received therefrom are not phase synchronous. In an exemplary implementation of system 10, the length difference of IOLs carrying parallel information of A and B copies may be up to plus or minus one hundred meters. A second contributing cause of phase misalignment is phase skew initiated in the matrices themselves. In a fully redundant system such as system 10, phase alignment is required to ensure error-free switching between A and B copies based on the results of performance monitoring or as otherwise specified. Furthermore, where signal multiplexing is performed, phase alignment is required for proper operation.

In particular, phase alignment is needed at all IOL-MUXs 120, 124, 130, 142, 146, 152, and 156 where STS-1P signal multiplexing is performed. Additionally, since tributary signal (VT) multiplexing is performed on tributary signal processing units 50, 52, and 60 and STS-1 MUXs 148 and 158, phase alignment is needed at those locations to ensure proper signal multiplexing.

Redundant equipment selection or plane swapping is performed in both high speed and low speed units 30, 32, and 54. Redundant equipment switching is further provided between tributary signal processors 50 and IOL-MUXs 130, tributary signal processors 60 and IOL-MUXs 142, tributary signal processors 52 and IOL-MUXs 152, and between tributary signal processors 50, 60 and 52 and originating and terminating matrix stages 136, 140 and 150. Therefore, phase alignment is needed at these locations to ensure proper redundant element switching.

III. Data & Timing Operation - Broadband Subsystem

Prior to describing the techniques of phase alignment, it may be instructional to describe the data flow and timing schemes within system 10 in more detail. In broadband fabric 14, the reference timing and associated frame signals 88 (FIG. 2) received from broadband timing subsystem 82 are aligned and tested prior to selecting one set as the active timing reference signals. Reference timing signal may be running at 6.48 MHz. The selected reference timing signal is then hierarchically distributed to matrix 20 and subsequently to its subsystems. The selected timing reference signal is transmitted to matrix 20 to be used as a reference for an internal oscillator (not shown) for generating a 51.84 MHz clock, for example, for transporting signals through matrix 20, and for timing outbound IOL-MUXs associated with matrix 20. Oscillators (not shown) associated with IOL-MUX 120 and 126 also generate a clock signal running at 622 MHz, for example, from the selected active reference timing signal.

In operation, SONET OC-N signals, such as OC-3 and OC-12, are terminated in high speed optical units 30 in broadband subsystem 14. Access to all of the section and line overhead fields for OC-N signals as defined in the aforementioned Bellcore TR253 document is provided in high speed optical units 30. As shown in FIG. 4, inbound STS-1 SPE signals are mapped into STS-1P signals locked to broadband time base 100 using pointer processing. The inbound signals are transmitted to redundant copies of groomers (not shown) where they are groomed for transport to IOL-MUX 124. Alignment buffers, to be described in more detail below, located on IOL-MUX 124 are used to align the received STS-1P signals to the inbound IOL-MUX timing scheme, since STS-1P signals arriving at IOL-MUX 124 may originate from different units and may be phase aligned to a different IOL. Furthermore, the serving technique is also used for phase alignment. Because of differences in cable length, the timing schemes of the IOL-MUXs may differ and thus requiring phase alignment.

Outbound STS-1P signals are multiplexed into OC-N signals on the interface units 30 and overhead information is inserted into the appropriate overhead fields. The outbound signals are frequency aligned but not necessarily phase aligned. Since phase alignment is required to permit synchronous multiplexing and redundant equipment switching, phase alignment buffers are provided in high speed optical units 30.

DS3 and electrical STS-1 signals are terminated in high speed electrical units 32. When STS-1 signals are terminated, the STS-1 SPE signals are mapped into STS-1P signals locked to broadband time base 100 by using pointer processing. DS3 signals, on the other hand, are asynchronously mapped into STS-1P SPE signals created on the DS3 interface using broadband timing. The resulting STS-1P signals are transmitted to redundant copies of IOL-MUX 124 for access to both A and B matrix planes 20. The STS-1P signals are multiplexed onto IOLs 36 and 36' for transport to matrix 20. In the outbound direction, IOL signals are demultiplexed to STS-1P signals at IOL-MUX 124 and then transmitted to high speed electrical units 32. Units 32 have access to both matrix planes 20 and are capable of independently selecting outbound STS-1P signals from either IOL copy.

IV. Data & Timing Operation - Wideband Subsystem

Timing information is similarly distributed in wideband subsystem 16. Redundant timing signals generated in wideband timing subsystem 84 (FIG. 2) are provided directly to center stage 138 of wideband matrix 22. The redundant timing signals are tested and one set is selected as the active timing reference. Each plane of matrix center stage 138 then provides one set of selected timing signals to originating and terminating stages 136, 140, and 150, which also test and select an active set of timing signals. The selected timing signals are then supplied to tributary signal processors 50, 52 and 60, and IOL-MUXs 142 and 152. Again the received timing signals are tested and one of them is selected. The selected wideband timing signals are then used to time functions and as a reference to IOLs 42, 42' 58 and 58' connected to tributary signal processors 50, 52, 60 when they are used in a master timing mode. IOL-MUXs 152 and 142 also use wideband timing and operate in the master timing mode. IOLs 40 and 40' use broadband timing. IOL-MUX 130 extracts timing from IOL 40 sourced by broadband IOL-MUX 126 and operates in a timing slave mode IOLs.

Tributary signal processors 50 and 52 provide the wideband interface to broadband and narrowband subsystem 14 and 18. Tributary signal processors 60 provide the interface to low speed unit shelves 54. When used as the interface to narrowband subsystem 18 or to low speed units 54, tributary signal processors 52 and 60 provide timing for the associated IOL signals in a master timing mode. When used for connections to a broadband subsystem 14, the IOL timing is locked to broadband timing in a slave timing mode.

In the master timing mode, outbound signals on the IOL or the IOL-12 signals are referenced to selected clock and frame signals received from wideband matrix 22. The IOL-12 signal is similar to an OC-12 signal with some section and line overhead portions used in a proprietary manner. The selected clock signal is used as a reference to an oscillator running at 622 MHz, for example, and the selected frame signal is used to initialize the frame phase of the outbound IOL timing scheme. A frame signal is also transmitted to the IOL-MUX 156 or 144 to be used as a reference signal for the servo process. The inbound IOL-12 signal is loop-timed to the outbound timing scheme at narrowband subsystem 18 and/or low speed units 54. The frame phase of the inbound signals is aligned to inbound tributary signal processor timing scheme by the wideband servoing process. Timing for the IOL-MUX 152 and/or 142 is derived from the wideband time base in a similar manner.

When operating in a slave timing mode, the inbound IOL-12 signals are locked to broadband time base 100 for both frequency and frame phase. Timing for IOL-MUX 130 is derived from the inbound IOL-12 signals. A 622 MHz clock, for example, is derived from the received data and a frame signal is generated based on IOL-12 framing. The outbound IOL-12 signal is loop-timed to the inbound time base. The outbound frame is offset from the inbound frame by IOL-MUX 130 to compensate for the differences in IOL-12 cable length.

Due to the nature of the signals requiring processing, asynchronous and synchronous tributary processor units are available. Asynchronous tributary processor units are provided to terminate STS-1 SPE signals carrying DS3 payloads and synchronous tributary processor units are provided to terminate STS-1 SPE signals carrying VT payloads.

Inbound traffic received at IOL-MUX 130 is demultiplexed to STS-1P bytes and transmitted to an asynchronous tributary processor unit of tributary signal processors 50. The pair of received signals is aligned with the inbound frame phase of the tributary signal processor IOL timing scheme through phase alignment buffers to permit redundant plane switching. Plane selection and switching may be done upon detecting abnormalities in certain monitored data, for example Line BIP-8 and channel ID. Other performance monitoring alterations include alarm indicator signal, yellow, out-of-frame, frame error monitoring. The STS-1P signals are further processed to terminate the STS-1 path and extract the DS3 signals by using the IOL timing scheme. This marks the end point for broadband time base 100 and the beginning of wideband time base 102 where the boundaries therebetween are traversed. The processes of terminating STS-1 path and creating the DS3 signals by using pointer interpretation and DS3 desynchronization enables a natural progression from broadband time base 100 to wideband time base 102.

The extracted DS3 signals are then further processed to extract DS1 signals using clock signals received with the DS3 data. Extracted DS1 signals are smoothed through desynchronizer circuits (not shown) and then mapped into wideband matrix payload envelopes using the inbound tributary signal processor timing scheme. The matrix payload envelopes are then transmitted to matrix 22 using the tributary signal processor timing scheme.

Outbound STS-1P frames are created from MTF data streams from wideband matrix 22 on asynchronous tributary processor units. Data from one matrix data plane is selected based on performance monitoring of the signals. DS1 signals are extracted from the matrix payload envelope frames timed by the tributary signal processor timing scheme. DS1 signals are transported using clocks generated by the desynchronizer circuits (not shown). A DS3 frame is created based on a 44 MHz oscillator (not shown). A STS-1P frame is created and DS3 signals are asynchronously mapped into STS-1 SPE frames using the IOL timing scheme. This point is selected as the interface between broadband and wideband time bases 100 and 102 for outbound signals to achieve seamless time base transition and yet requires no additional pointer movement. The STS-1P frames are phase aligned to the outbound tributary signal processor IOL timing scheme. The outbound signals are aligned to the outbound frame phase of IOL-MUX 130 through the use of phase alignment buffers therein. The aligned signals are then multiplexed for transport on IOL 40 and 40' to broadband subsystem 14.

Timing distribution for the synchronous tributary signal processors connected to a broadband subsystem 14 is similar to the asynchronous subsystem described above. As with asynchronous tributary signal processing, STS-1P signals received from the IOL are aligned to a tributary IOL timing scheme that is frequency-locked to IOL timing so that equipment switching may be accomplished. The STS-1P signals are processed to extract the SPEs which are transmitted using timing signals derived from the IOL timing scheme. The IOL timing scheme is also used to process the SPE to terminate the STS-1 path and extract the VT payloads. The VT payloads are written into the VT pointer processor buffers (not shown) for pointer processing using IOL based timing signals. Implemented in this manner, the time base boundary is selected where the inbound side of VT pointer processor buffers is the end point of broadband time base 100 for inbound traffic, and the beginning of wideband time base 102. The VT payloads are read from the buffers and mapped into VT frames created by using the tributary signal processor timing scheme. The VT frames are then mapped into matrix payload envelope frames and transmitted to matrix 22 using inbound tributary signal processor timing.

For VT-to-VT cross-connection, the matrix payload envelope signals are transmitted directly to matrix 22. When a gateway function is required for asynchronous to VT mapping, the VT signals carried by the matrix payload envelopes are terminated to extract the asynchronous signals, which are then desynchronized. The asynchronous signals are transmitted using clocks generated by the desynchronizer circuit (not shown). The asynchronous signals are mapped into matrix payload capacity frame SPEs.

For the outbound direction, the timing scheme is reversed. The tributary signal processor timing scheme is used until the STS-1 SPEs are mapped into STS-1P frame in the IOL timing scheme using STS pointer processing. For VT-to-VT cross-connections, VT signals are extracted from the matrix payload envelope frames received from matrix 22 and mapped directly into the STS-1 SPEs. Since both the VT signals and the STS-1 SPE are based on tributary signal processor timing, VT pointer processing is not required.

V. Data & Timing Operation - Narrowband Subsystem

As shown in FIG. 2, timing in narrowband fabric 108 is derived from narrowband timing subsystem 86. However, as shown in FIGS. 3 and 4, the IOL spans 42 and 42' which link narrowband subsystem 18 to wideband subsystem 16 are part of wideband time base 102. The interface between wideband and narrowband time bases is located in narrowband interface or unit controller (UC) subsystem 160. The timing scheme for IOL-MUX 156 is derived from the outbound IOL data. The inbound IOL-MUX frame phase is offset from the outbound frame phase using the servoing technique.

In narrowband subsystem 18, a clock signal is distributed from IOL-MUX 156 to corresponding STS-1P MUX 158, which uses it as a reference for its timing scheme. The IOL-MUX timing scheme is used as the timing reference for the wideband side of the interface units 160. The inbound and outbound frame phases of wideband interface unit timing scheme is determined by frame signals generated by STS-1P MUX 158.

Outbound traffic relative to wideband subsystem 16 received at narrowband IOL-MUX 156 is demultiplexed to STS-1P signals and transmitted to STS-1P MUX 158. The STS-1P signals are terminated at the STS-1P MUX 158 and the VT or matrix payload capacity signals are extracted from the SPE. The extracted VT or matrix payload capacity signals and associated frame signals are then transmitted to narrowband interface units 160 using the STS-1P MUX outbound timing scheme.

VT or matrix payload capacity signals arriving at interface units 160 are terminated and the payloads therein are extracted using timing signals derived from wideband time base 102. For byte synchronous mapped VTs, DS0 signals may be directly extracted from the VTs. For asynchronous mapped VTs and matrix payload capacity frames, the asynchronous signals are extracted from the synchronous frames and the DS0 signals are extracted from the asynchronous signals. In either case, the DS0 signals are written into a slip buffer (not shown) using the wideband interface unit timing scheme and read from the buffer using narrowband time base 104. The slip buffer serves as the interface between wideband and narrowband time bases for the outbound direction. Further processing of the DS0 signals are done using narrowband time base 104.

Inbound DS0 signals are mapped into an asynchronous signal, such as DS1 or DS1C, or directly into byte synchronous mapped VTs using narrowband timing. The type of mapping used is dependent on the type of cross-connection performed at wideband subsystem 16. Except for byte synchronous mapped VTs where the DS0 signals may be mapped directly into the VT SPE, the DS0 signals are mapped into an asynchronous frame. If the wideband cross-connection is to a VT mapped STS-1 SPE, the asynchronous signal is mapped into the corresponding VT type. If the wideband cross-connection is to a DS3 mapped STS-1 SPE or to a low speed unit 54, the asynchronous signals are mapped to a matrix payload capacity signal. For byte synchronous mapping, the asynchronous signal is mapped into a VT SPE created by using narrowband timing. DS0 signals are mapped directly into the VT SPE when byte synchronous mapping is used. VT frames are created using the wideband interface unit timing scheme and the VT SPEs are mapped into the VT frames using pointer processing. For byte synchronous VTs, the VT pointer processor is the interface between wideband and narrowband time bases 102 and 104 for inbound traffic.

For matrix payload capacity frames and asynchronously mapped VT signals, the asynchronous signals are asynchronously mapped into VTs or matrix payload capacity SPEs created using the wideband interface timing scheme. The interface between wideband and narrowband time bases 102 and 104 are at the point where the asynchronous signals are mapped into the SPE. The asynchronously mapped SPEs are directly mapped into the VT or matrix payload capacity frames without pointer processing since both signals are locked to the same timing scheme.

The VT or matrix payload capacity signals are transmitted to the associated STS-1P MUX 158 using the wideband interface unit timing scheme, which multiplexes the signals into a STS-1 SPE. The STS-1P frames and SPEs created in STS-1P MUX 160 are aligned to the inbound STS-1P MUX timing scheme. The generated STS-1P signals are then transmitted to IOL-MUX 156. Alignment buffers thereon are used to phase align the STS-1P signals to the inbound IOL-MUX timing scheme. The aligned signals are then multiplexed onto IOL 42 and 42' for transport to wideband tributary signal processors 52.

VI. Phase Alignment

As discussed above, phase alignment in integrated multi-fabric digital cross-connect system 10 is achieved by using several techniques including alignment buffering and servoing. Servoing is a technique used to adjust for gross phase misalignment in order to reduce the depth of alignment buffers required and associated buffering delays to further align the signals. These techniques are described in detail below.

Figure 5:
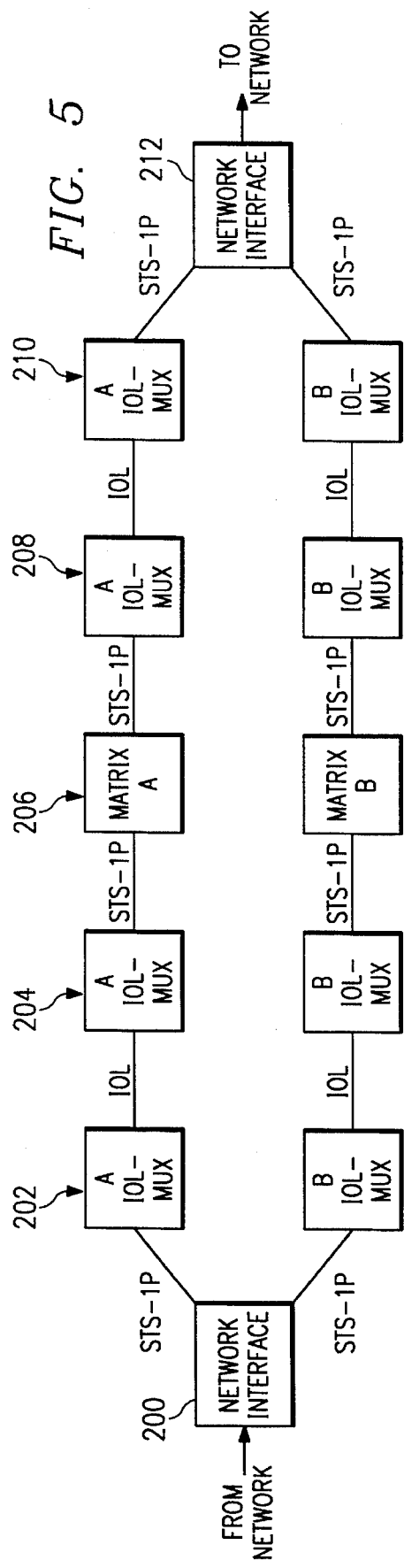
FIG. 5 is a simplified block diagram showing an exemplary data flow.

FIG. 5 shows a simplified data flow for broadband subsystem 14 to illustrate the mechanism and method for alignment buffering and servoing. Broadband network interface units 200 receive payloads from the network and package them in STS-1P containers. The STS-1P containers are transmitted to A and B copies of IOL-MUX 202, which multiplexes the signals onto an IOL. Each IOL is capable of carrying twelve STS-1P containers aligned and multiplexed into an IOL-12 signal. As described above, the IOL-12 signal is similar to an OC-12 signal with some proprietary use of certain section and line overhead fields. The STS-1P containers are received by IOL-MUX 204 of broadband matrix 206, cross-connected, and then transmitted outbound onto an IOL through IOL-MUX 208. IOL-MUX copies 210 then provide the outbound STS-1P signals to network interface units 212, which extract payloads from STS-1P containers and send one copy onto the network.

Figure 6:
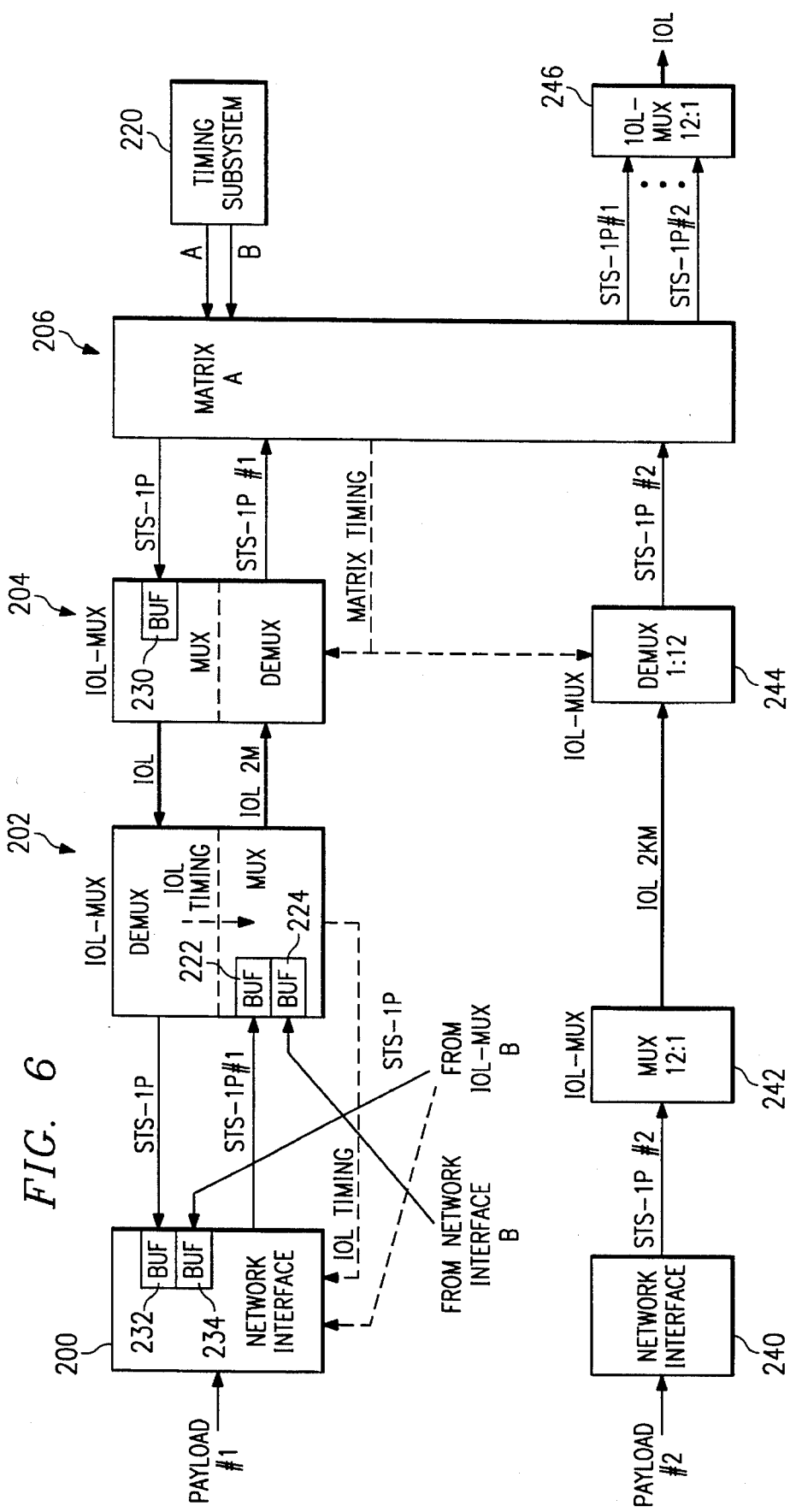
FIG. 6 is a simplified block diagram of the phase alignment buffers and their environment.

Referring to FIG. 6, network interface TSP 200 receives payload #1 from the network. Payload #1 is packaged into an STS-1P #1 container and the inbound multiplexer portion of IOL-MUX 202 transmits it on an IOL to a demultiplexer portion of IOL-MUX 204 and matrix 206. As shown, a timing subsystem 220 provides redundant timing signals to matrix 206. The outbound IOL-12 signals are generated based on the matrix timing and frame phase, as shown. The timing at network interface 200 is derived from the outbound IOL-12 signals. The IOL timing derived from the outbound IOL-12 signals are further used to generate the inbound STS-1P containers and inbound IOL-12 signals. Note that network interface units 200 receive IOL timing from both A and B copies of IOL-MUX 202. The redundant timing signals are tested, aligned and one copy selected as the active signal based on performance monitoring of specific parameters. The selected IOL timing scheme serves as a reference to an internal oscillator (not shown) in the network interface units 200. In this manner, inbound signals are derived from and traceable to the matrix timing scheme. However, without servoing and phase alignment, the frame phase of the inbound IOL-12 signal is delayed relative to the matrix timing scheme by the round-trip transmission time on the IOL.

Phase alignment buffers are used to align data signals at the required points in system 10. Generally, the data signals are written into the alignment buffers at one timing scheme and read therefrom using a common second timing scheme. Buffer depth is determined by the maximum anticipated or specified phase skew in the system. When great phase misalignment is encountered, the servoing technique is employed to reduce the amount of buffering required to phase align the signals.

Referring to the specific example shown in FIG. 6, outbound STS-1P containers received at IOL-MUX 204 from matrix 206 are aligned to the outbound IOL timing scheme using alignment buffers 230. Alignment buffers 230 accommodate phase skew due to inaccuracies or incomplete alignment on the servo mechanism and additional skew accumulated through matrix 206. Outbound traffic received at the demultiplexer portion of IOL-MUX 202 are demultiplexed to STS-1P signals and transmitted to interface units 200. As shown, outbound STS-1P containers are received by interface units 200 from both A and B copies of IOL-MUX 202. Since the two copies may be out of frame phase because of different cable lengths, the received STS-1P signals are aligned with the outbound frame phase of interface units 200 through the use of phase alignment buffers 232 and 234.

Inbound STS-1 signals received from the network are line terminated to extract the payloads, which are then mapped into STS-1P containers created in interface units 200 using pointer processing. Inbound DS3 signals are mapped in to STS-1 SPEs by using the inbound interface unit timing scheme. SPEs containing the DS3 signals are directly mapped into STS-1P containers using fixed pointers. The STS-1P containers created are all phase aligned to the inbound interface unit timing scheme and transmitted to the multiplexer portion of IOL-MUX 202 using the interface unit timing scheme. The received signals are aligned to the inbound frame phase of IOL-MUX through phase alignment buffers 222 and 224. The phase aligned STS-1P signals are then transported to matrix 206 on the IOL.

Figure 7:
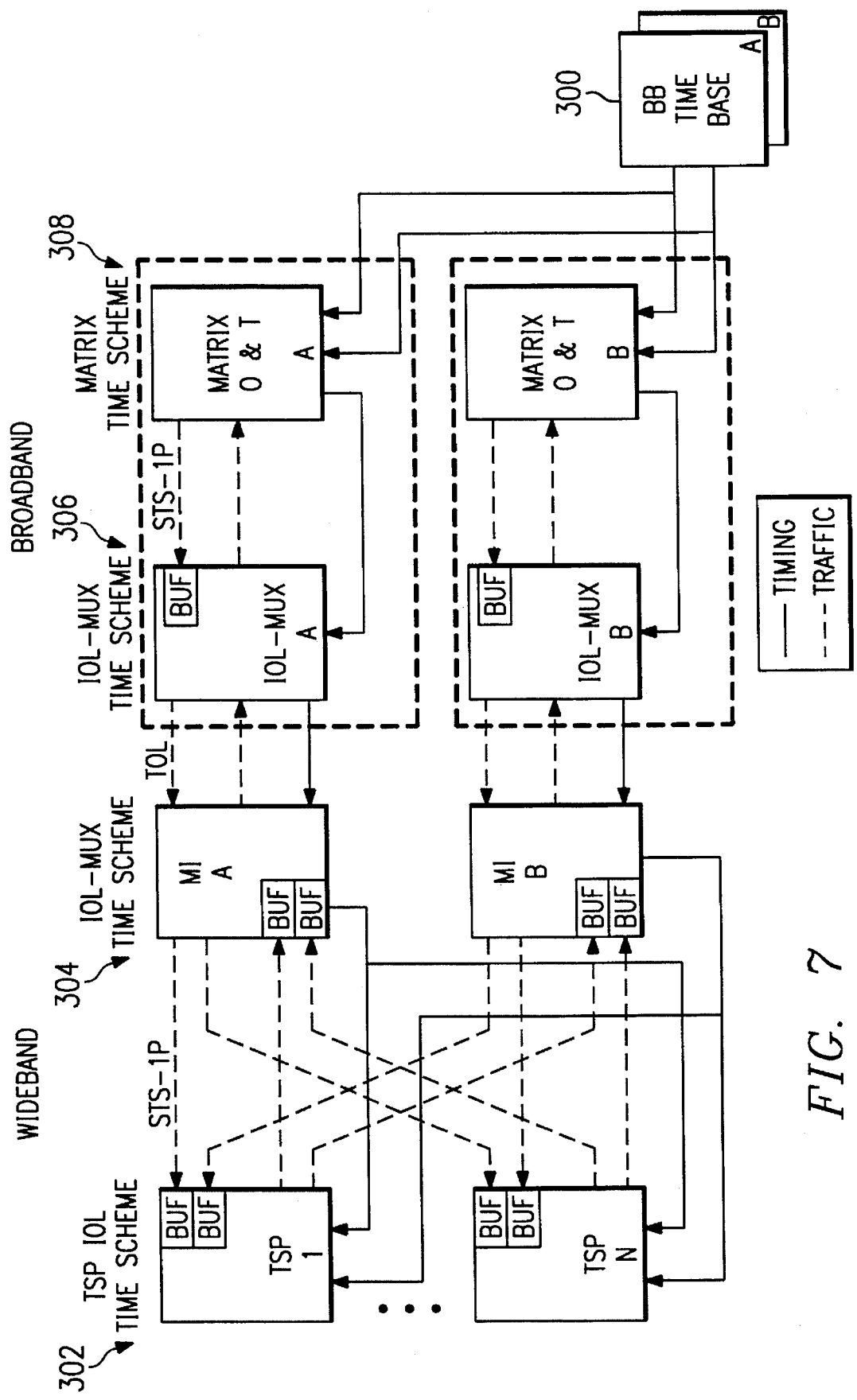
FIG. 7 is a simplified block diagram of broadband and wideband interface timing.

FIG. 7 illustrates the use of phase alignment buffers associated with tributary signal processors in wideband subsystem 16 (FIG. 1), where tributary signal processors 302 provide the interface to broadband subsystem 14 (FIG. 1). When connecting a wideband subsystem 16 to a broadband subsystem 14, the associated IOL is part of broadband time base 100 and signals transmitted from tributary signal processors 302 to connected IOL-MUX 304 are loop-timed to IOL signals received from broadband subsystem 14. The operation of IOL-MUX 304 and the connections to broadband subsystem 14 is the same as the connections to the high speed optical and electric unit shelves. The time base for IOL-MUX 304 is derived from the IOL data stream received from broadband matrix 20 (FIG. 1). The frame phase of the IOL signal transmitted to broadband matrix 20 is off-set from the phase of the received IOL signal using the servo mechanism. The time bases of the IOL-MUXs 304 are used as the timing reference for the IOL side of tributary signal processors 302. Since the boundary between broadband and wideband time bases is on tributary signal processors 302, the matrix side of tributary signal processors is part of wideband time base 102.

Each tributary signal processor 302 receives clock and STS-1P signals from the A and B copies of IOL-MUX 304. The timing signals are tested, aligned, and one copy selected as the active copy. The active clock is used as a reference to a 51.84 MHz oscillator, for example, that serves as the basis for the TSP IOL time scheme. The frame phase of the active STS-1P signal as defined by the framing overhead is used to reference the inbound frame phase of the TSP IOL time scheme. The outbound frame phase of the TSP IOL time scheme is off-set from the inbound frame phase by the same magnitude as the servoed off-set on IOL-MUX 304.

As shown in FIG. 7, inbound traffic received at IOL-MUX 304 from broadband subsystem 14 is demultiplexed to STS-1P signals and then transmitted to tributary signal processors 302. The pair of received signals is aligned with the inbound frame phase of the TSP IOL time scheme through the use of phase alignment buffers on tributary signal processors 302 so that errorless plane selection and swapping may be accomplished.

Outbound STS-1P frames are created in tributary signal processors 302. The STS-1P frames are phase aligned to the outbound TSP IOL time scheme. The STS-1P signals transmitted to IOL-MUX 304 is not exactly aligned with each other since the TSP IOL time schemes operate on independent oscillators. The outbound signals are aligned to the outbound frame phase of IOL-MUX 304 through phase alignment buffers on IOL-MUX 304. The aligned STS-1P signals can then be multiplexed to IOL signals for transport to broadband subsystem 14.

Figure 8:
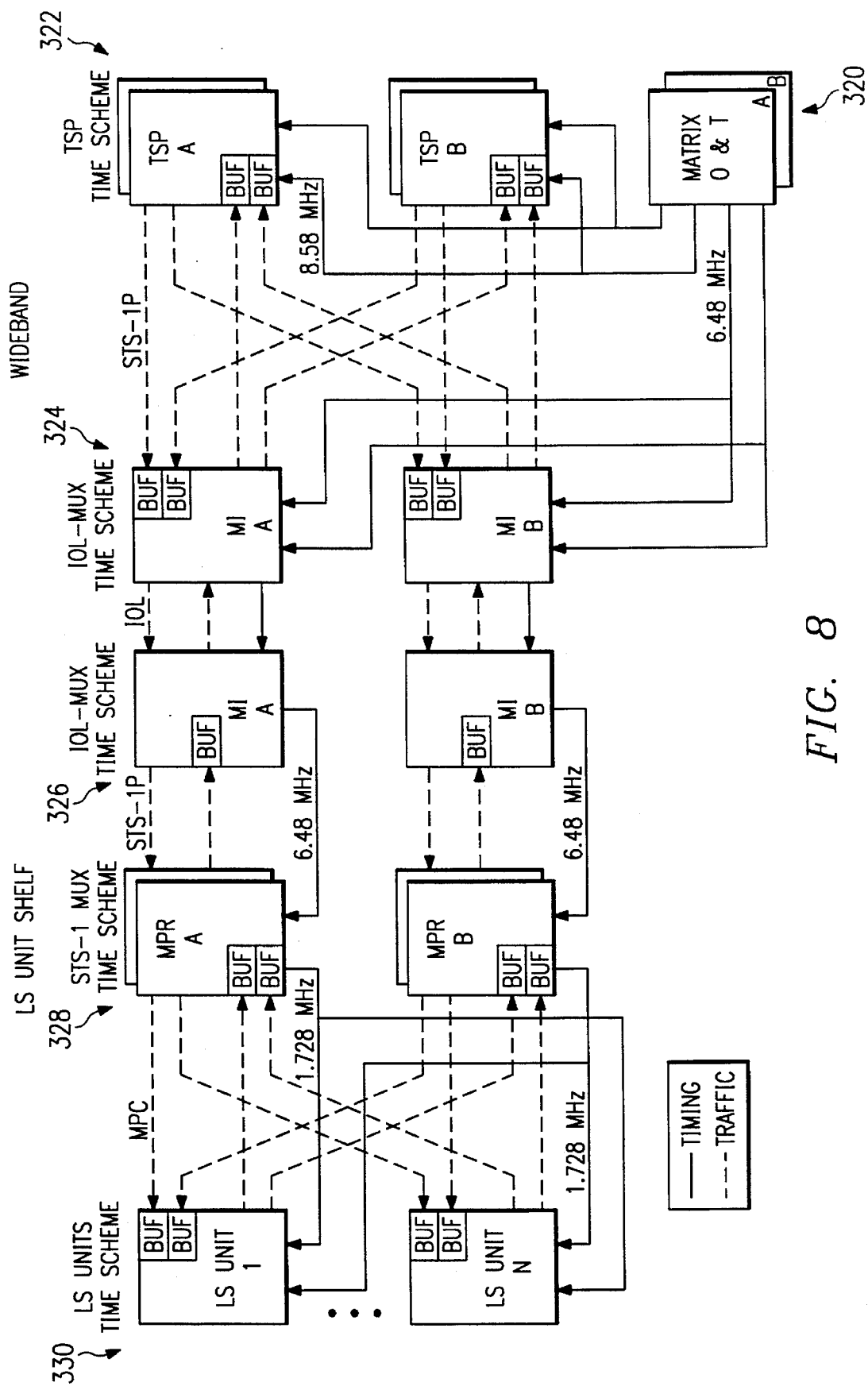
FIG. 8 is a simplified block diagram of wideband and low speed unit timing.

Referring to FIG. 8, phase alignment buffering in the tributary signal processors serving as the interface between wideband subsystem 16 and low speed unit shelves 144 is shown. The timing for tributary signal processors serving as interfaces between wideband subsystem 16 and narrowband subsystem 18 is similar and therefore not specifically described herein. Timing signals from wideband time base 102 are distributed through wideband matrix center stage 138 to originating and terminating units 136, 140, and 150 (FIG. 4), and then to IOL-MUXs 324 connected to tributary signal processors 322 (FIG. 8). A tributary signal processor time scheme is created on each tributary signal processor and are indirectly timed by wideband time base 102. A tributary signal processor IOL time scheme is derived from the inbound IOL signal in the same way as for tributary signal processors connected to broadband subsystem 14. However, since the IOL timing is referenced to wideband timing, the two time schemes have the same average frequency. The interface between the two time schemes is required to accommodate small amounts of jitter and wander produced around the IOL loop. The frame phase of outbound tributary signal processor timing is linked to the frame phase of wideband time base signals. The frame phase of inbound timing is servoed to the wideband matrix.

As shown in FIG. 8, two copies of wideband timing is received at IOL-MUXs 324. The clocks are phase aligned, tested, and one copy selected as the active reference for IOL-MUX timing scheme. An oscillator generates a 622 MHz clock using the selected active clock. The generated clock and the active outbound frame signal provide the basis for the outbound IOL-MUX timing scheme. STS-1P signals received at IOL-MUXs 324 from tributary signal processors 322 are aligned to the IOL-MUX timing scheme using alignment buffers in IOL-MUXs 324. The phase aligned STS-1P signals are then multiplexed to the outbound IOL for transport to low speed units 330 or narrowband subsystem 18.

Inbound IOL signals are loop timed to the outbound signals at low speed units 330. Circuits (not shown) on IOL-MUXs 326 determines the phase of received IOL signals relative to the local timing scheme. The phase of inbound IOL signals are servoed at low speed units 330 to provide a coarse alignment of the inbound signals received at tributary signal processors 322. Inbound timing for IOL-MUXs 324 is derived from the inbound IOL data. The IOL signals are demultiplexed to STS-1P signals and transmitted to tributary signal processors 322 using timing signals derived from inbound IOL-MUX timing scheme. STS-1P signals are received by tributary signal processors 322 from both IOL-MUX copies 324. The received STS-1P signals are then phase aligned to the inbound tributary signal processor timing scheme through phase alignment buffers in tributary signal processors 322. Both copies are monitored and one copy is selected as the active copy for processing in tributary signal processors 322.

FIG. 6 further illustrates in more detail a situation where servoing is required. A data path is shown where two inbound payload signals, payload #1 and #2, are received and transported to matrix 206 on two different IOLs, one of which is two meters in length, and the other two kilometers. Payload #2 is received at network interface units 240, sent to IOL-MUX 242, and transported on the two kilometer IOL to IOL-MUX 244. The two inbound signals are then cross-connected by matrix 206 to the same outbound IOL through IOL-MUX 246. Servoing adjusts the framing of STS-1P containers so that they arrive at matrix 206 approximately in phase. As described above, fine adjustments in phase are done by using phase alignment buffers. The servo frame adjustment compensates for the entire round-trip transmission delay on the IOL. Generally, the beginning of each inbound STS-1P container and the beginning of the IOL-12 frames are advanced to cancel out the difference in IOL transmission delay between the two meter length and the two kilometer length.

Figure 9:
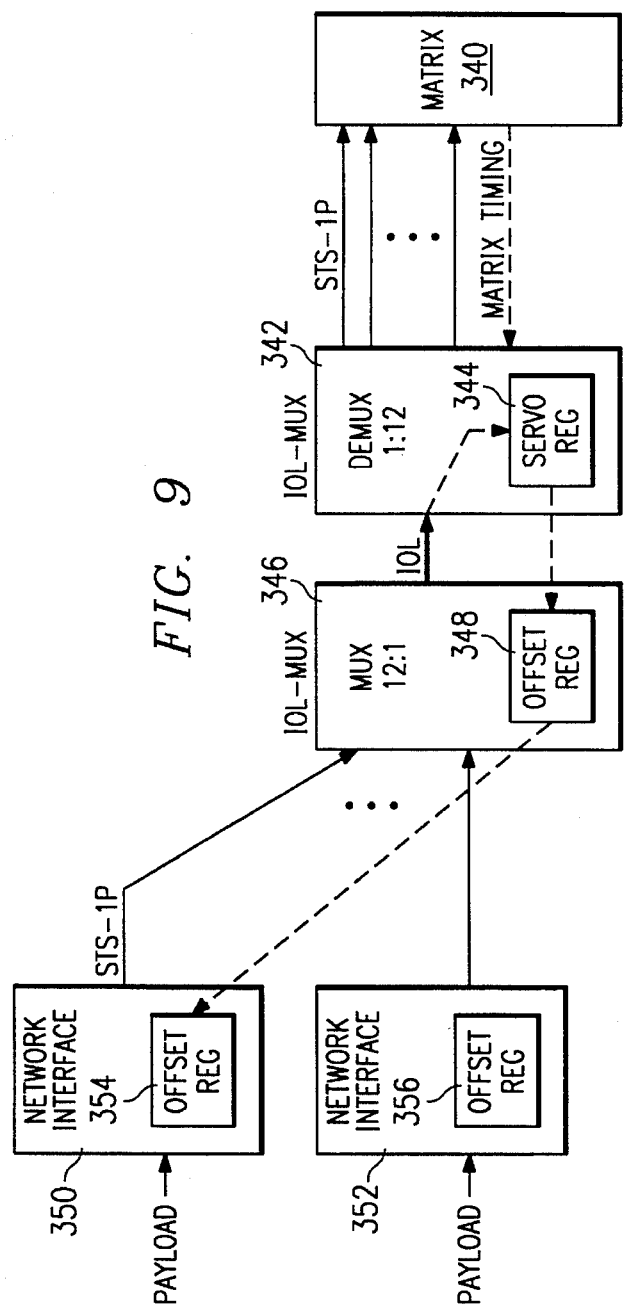
FIG. 9 is simplified block diagram showing an exemplary embodiment of the servo mechanism.

Referring to FIG. 9, an exemplary implementation of the servo technique in system 10 is shown. Generally, servoing is used in system 10 to adjust the signal phase at the source. As shown, a matrix 340 is coupled to an IOL-MUX 342, providing matrix timing thereto and receiving STS-1P containers therefrom. IOL-MUX 342 includes a servo register 344 which contains an inbound offset value. Inbound offset value represents the offset of the inbound IOL-12 signal frame relative to the matrix frame. IOL-MUX 342 demultiplexes inbound IOL-12 traffic received from an IOL, which is linked to an IOL-MUX 346. IOL-MUX 346 includes an offset register 348, which contains an outbound offset value. Outbound offset value specifies where the inbound IOL-12 signal frame is to be generated relative to the frame derived from the outbound IOL-12 signal. The outbound offset value in offset register 348 is derived from inbound offset value in servo register 344. Network interfaces 350 and 352 receive payloads from the network, package them into STS-1P containers and provide them to IOL-MUX 346 for transport to matrix 340. Each network interface 350 and 352 also has an offset register 354 and 356, respectively, for storing an STS-1P offset value. STS-1P offset values are used to adjust the STS-1P frames so that they all arrive at matrix 340 during the appropriate timing window. STS-1P offset values are computed by adding a known constant to the outbound offset value in offset register 348.

Upon initialization, the inbound offset value in servo register 344 is set so that the start-of-frame for all the STS-1P signals passing through matrix 340 arrive at the outbound IOL-MUX from matrix 340 in a specified timing window. The inbound offset value is determined analytically and verified empirically. For example, for broadband matrix 20 in system 10, the inbound offset value in all servo registers has been set to 19. To initialize the servo mechanism for a particular IOL, the value in servo register 344 is read and the difference between the required value, i.e. 19, and the current value without servo adjustment is computed. The difference or delta value is then used to adjust the outbound offset value in offset register 348. By using the adjusted outbound offset value, the value in servo register 344 is verified to determine correctness. The STS-1P offset value in offset register 354 is then determined by adding a constant to the value in offset register 348. For example, for a DS3 interface in high speed electrical units 32, the constant is 29.

A similar servo mechanism is used to align signals received at wideband tributary signal processors 52 from narrowband subsystem 18 and from low speed unit shelves 144. Signals received from broadband subsystem 14 generally do not require phase alignment via servoing since the received signals are terminated before they are cross-connected. The servo technique is also used to minimize phase skew at wideband center stage 138 (FIG. 4). The phase of signals received at center stage 138 is compared with the phase of their local timing scheme to determine an offset value for each tributary signal processor subsystem. The offset values are transmitted to the tributary signal processor subsystems via administration and control subsystem 12. The offset values are used to adjust the phase of the inbound signals relative to the outbound signals at the tributary signal processors to minimize the depth of alignment buffering required.

Although the present invention and its advantages have been described in detail, it should be understood that various changes, substitutions and alterations can be made therein without departing from the spirit and scope of the invention as defined by the appended claims.

What is claimed is:

1. A timing architecture for an integrated multi-rate synchronous transfer mode cross-connect system, said integrated multi-rate synchronous transfer mode cross-connect system integrating broadband, wideband, and narrowband subsystems having broadband, wideband, and narrowband cross-connect matrices, respectively, the timing architecture comprising:

a broadband time base encompassing said broadband cross-connect matrix circuit switching synchronous STS-1 level bit streams;

a wideband time base encompassing said wideband cross-connect matrix circuit switching synchronous VT1.5 and VT2 level bit streams;

a narrowband time base encompassing said narrowband cross-connect matrix circuit switching synchronous DS0 level bit streams;

a broadband-wideband interface coupled between said broadband and wideband cross-connect matrices for transmitting said synchronous bit streams therebetween directly without a network interface; and a wideband-narrowband interface coupled between said wideband and narrowband cross-connect matrices for transmitting said synchronous bit streams therebetween directly without a network interface.

2. The timing architecture, as set forth in claim 1, further comprising:

first and second redundant timing reference signals;

a broadband timing subsystem coupled to said broadband matrix for receiving said first and second redundant timing reference signals, said broadband matrix selecting one of said redundant timing reference signals as an active timing signal and generating broadband timing signals therefrom for distribution throughout said broadband time base;

a wideband timing subsystem coupled to said wideband matrix for receiving said first and second redundant timing reference signals, said wideband matrix selecting one of said redundant timing reference signals as an active timing signal and generating wideband timing signals therefrom for distribution throughout said wideband time base; and a narrowband timing subsystem coupled to said narrowband matrix for receiving said first and second redundant timing reference signals, said narrowband matrix selecting one of said redundant timing reference signals as an active timing signal and generating narrowband timing signals therefrom for distribution throughout said narrowband time base.

3. The timing architecture, as set forth in claim 1, wherein said broadband subsystem further comprises high speed line termination units and long-distance optical links coupling said high speed line termination units to said broadband cross-connect matrix, and further long-distance optical links coupling said broadband cross-connect matrix to said wideband subsystem, said broadband time base encompassing said high speed line termination units and both said long-distance optical links.

4. The timing architecture, as set forth in claim 3, further comprising circuitry for loop-timing outbound traffic of said broadband subsystem to inbound traffic on said long-distance optical links.

5. The timing architecture, as set forth in claim 3, further comprising circuitry for phase alignment associated with said optical links.

6. The timing architecture, as set forth in claim 5, wherein broadband subsystem comprises redundant copies of cross-connect matrix, optical links and multiplexers, and circuitry for monitoring said redundant copies, selecting one as an active copy, and circuitry for switching said active copy to another copy.

7. The timing architecture, as set forth in claim 1, wherein said wideband subsystem further comprises low speed line termination units and long-distance optical links coupling said wideband cross-connect matrix thereto, said wideband time base encompassing said low speed line termination units and said long-distance optical links.

8. The timing architecture, as set forth in claim 7, further comprising circuitry for loop-timing inbound traffic to outbound traffic on said long-distance optical links.

9. The timing architecture, as set forth in claim 7, further comprising circuitry for phase alignment associated with said optical links.

10. The timing architecture, as set forth in claim 9, wherein wideband subsystem comprises redundant copies of cross-connect matrix, optical links and multiplexers, and circuitry for monitoring said redundant copies, selecting one as an active copy, and circuitry for switching said active copy to another copy.

11. The timing architecture, as set forth in claim 1, wherein said narrowband cross-connect matrix is coupled to said wideband cross-connect matrix by long-distance optical links, said wideband time base encompassing said long-distance optical links therebetween.

12. The timing architecture, as set forth in claim 11, further comprising circuitry for phase alignment associated with said optical links.

13. The timing architecture, as set forth in claim 12, wherein narrowband subsystem comprises redundant copies of cross-connect matrix, optical links and multiplexers, and circuitry for monitoring said redundant copies, selecting one as an active copy, and circuitry for switching said active copy to another copy.

14. The timing architecture, as set forth in claim 11, further comprising circuitry for loop-timing inbound traffic of said wideband subsystem to outbound traffic on said long-distance optical links.

15. The timing architecture, as set forth in claim 1, wherein said broadband-wideband interface comprises pointer processing circuitry for frequency justification of said synchronous bit streams transmitted between said broadband and wideband time bases.

16. The timing architecture, as set forth in claim 1, wherein said wideband-narrowband interface comprises pointer processing circuitry for frequency justification of said synchronous bit streams transmitted between said wideband and narrowband time bases.

17. The timing architecture, as set forth in claim 2, wherein:

said broadband subsystem further comprises high speed line termination units and long-distance optical links coupling said high speed line termination units to said broadband cross-connect matrix, and long-distance optical links coupling said broadband cross-connect matrix to said wideband subsystem;

said wideband subsystem further comprises low speed line termination units and long-distance optical links coupling said wideband cross-connect matrix thereto;

said narrowband cross-connect matrix is coupled to said wideband cross-connect matrix by long-distance optical links; and each said optical links carrying a plurality of multiplexed signals, the timing architecture further comprising circuitry for phase alignment associated with each said optical link.

18. The timing architecture, as set forth in claim 17, wherein said phase alignment circuitry comprises phase alignment buffers for receiving data at a receiving phase and outputting data at an outputting phase.

19. The timing architecture, as set forth in claim 17, wherein said phase alignment circuitry comprises servoing circuitry.

20. The timing architecture, as set forth in claim 19, wherein said servoing circuitry includes an offset register for storing an offset value representing the phase offset between an inbound signal on said optical links and a local timing scheme.

21. The timing architecture, as set forth in claim 20, wherein said servoing circuitry further comprises circuitry for adjusting the phase of said inbound signal using said offset value.

22. The timing architecture, as set forth in claim 2, wherein said wideband subsystem further comprises tributary signal processors multiplexing inbound and outbound signals to and from said wideband matrix, the timing architecture further comprising circuitry for phase alignment associated with each said tributary signal processor.

23. The timing architecture, as set forth in claim 22, wherein said phase alignment circuitry comprises:

phase alignment buffers for receiving data at a receiving phase and outputting data at an outputting phase; and a servoing circuitry.

24. The timing architecture, as set forth in claim 23, wherein said servoing circuitry includes:

an offset register for storing an offset value representing the phase offset between an inbound signal a local timing scheme; and circuitry for adjusting the phase of said inbound signal using said offset value.

25. The timing architecture, as set forth in claim 2, further comprising circuitry for monitoring said first and second redundant timing reference signals and selecting one as an active timing reference signal.

26. The timing architecture, as set forth in claim 25, further comprising circuitry for switching between said first and second redundant timing reference signals.

27. A method for timing an integrated multi-rate cross-connect system integrating broadband, wideband, and narrowband subsystems, said broadband, wideband and narrowband subsystems including broadband, wideband, and narrowband cross-connect matrices, respectively, comprising the steps of:

circuit switching synchronous STS-1 level bit streams in said broadband cross-connect matrix;

circuit switching synchronous VT1.5 and VT2 level bit streams in said wideband cross-connect matrix;

circuit switching synchronous DS0 level bit streams;

interfacing said broadband and wideband cross-connect matrices for transmitting said synchronous bit streams therebetween without a network; and interfacing said wideband and narrowband cross-connect matrices for transmitting said synchronous bit streams therebetween without a network.

28. The timing method, as set forth in claim 27, further comprising the steps of:

generating first and second redundant timing reference signals;

distributing said first and second redundant timing reference signals to a broadband timing subsystem coupled to said broadband matrix, said broadband matrix selecting one of said redundant timing reference signals as an active timing signal and generating broadband timing signals therefrom for distribution throughout said broadband time base;

distributing said first and second redundant timing reference signals to a wideband timing subsystem coupled to said wideband matrix, said wideband matrix selecting one of said redundant timing reference signals as an active timing signal and generating wideband timing signals therefrom for distribution throughout said wideband time base; and distributing said first and second redundant timing reference signals to a narrowband timing subsystem coupled to said narrowband matrix, said narrowband matrix selecting one of said redundant timing reference signals as an active timing signal and generating narrowband timing signals therefrom for distribution throughout said narrowband time base.

29. The timing method, as forth in claim 28, further comprising the steps of:

monitoring and testing said first and second timing reference signals; and deselecting said selected active timing signal and selecting the other redundant timing reference signal.

30. The timing method, as set forth in claim 28, further comprising the step of loop-timing inbound traffic to outbound traffic of respective subsystems on long-distance optical links coupling high speed line termination units to said broadband cross-connect matrix, and said broadband cross-connect matrix to said wideband subsystem.

31. The timing method, as set forth in claim 30, further comprising aligning the phases of signals on said optical links.

32. The timing method, as set forth in claim 27, further comprising the step of loop-timing inbound traffic to outbound traffic on long-distance optical links coupling low speed line termination units to said wideband cross-connect matrix.

33. The timing method, as set forth in claim 32, further comprising the step of aligning the phases of signals on said optical links.

34. The timing method, as set forth in claim 33, further comprising the steps of:

selecting from among redundant copies of cross-connect matrix, optical links and multiplexers an active copy; and switching to another redundant copy in response to detecting performance failure in the active copy.

35. The timing method, as set forth in claim 34, further comprising the steps of:

selecting from among redundant copies of cross-connect matrix, optical links and multiplexers an active copy; and switching to another redundant copy in response to detecting performance failure in the active copy.

36. The timing method, as set forth in claim 27, further comprising the step of loop-timing inbound traffic to outbound traffic on long-distance optical links coupling said narrowband cross-connect matrix to said wideband subsystem.

37. The timing method, as set forth in claim 27, wherein said broadband-wideband interfacing step comprises the step of pointer processing for frequency justification between said broadband and wideband time bases.

38. The timing method, as set forth in claim 27, wherein said wideband-narrowband interfacing step comprises the step of pointer processing for frequency justification between said wideband and narrowband time bases.

39. The timing method, as set forth in claim 27, further comprising the steps of:

signal multiplexing and demultiplexing; and aligning the phases of multiplexed signals.

40. The timing method, as set forth in claim 39, wherein said phase aligning step comprises the step of receiving and buffering data at a receiving phase and outputting data at an outputting phase.

41. The timing method, as set forth in claim 39, wherein said phase aligning step comprises the step of servoing.

42. The timing method, as set forth in claim 41, wherein said servoing step includes the steps of:

determining a phase offset between a multiplexed signal and a local timing scheme;

storing said phase offset in an offset register; and adjusting the phase of said inbound signal using said offset value.

43. The timing method, as set forth in claim 27, further comprising the steps of:

switching between redundant equipment; and aligning the signals to be transmitted by switchable equipment.

44. The timing method, as set forth in claim 43, wherein said phase aligning step comprises the steps of:

receiving and buffering data at a receiving phase and outputting data at an outputting phase; and servoing.

45. The timing method, as set forth in claim 44, wherein said servoing step includes the steps of:

determining a phase offset between an inbound multiplexed signal and a local timing scheme;

storing said phase offset in an offset register; and adjusting the phase of said inbound signal using said offset value.

46. A timing architecture for an integrated multi-rate synchronous transfer mode cross-connect system, said integrated multi-rate synchronous transfer mode cross-connect system integrating broadband and wideband subsystems having broadband and wideband cross-connect matrices, respectively, the timing architecture comprising:

a broadband time base encompassing said broadband cross-connect matrix circuit switching synchronous STS-1 level bit streams;

a wideband time base encompassing said wideband cross-connect matrix circuit switching synchronous VT1.5 and VT2 level bit streams; and a broadband-wideband interface coupled between said broadband and wideband cross-connect matrices for transmitting said synchronous bit streams therebetween directly without a network interface.

47. The timing architecture, as set forth in claim 46, further integrating a narrowband subsystem having a narrowband cross-connect matrix, further comprising:

a narrowband time base encompassing said narrowband cross-connect matrix circuit switching synchronous DSO level bit streams; and a wideband-narrowband interface coupled between said wideband and narrowband cross-connect matrices for transmitting said synchronous bit streams therebetween directly without a network interface.

48. The timing architecture, as set forth in claim 5, wherein said integrated broadband, wideband, and narrowband subsystems includes redundant signal transmission planes, and circuitry for selectively switching between phase-aligned signals on said redundant signal transmission planes.

49. The timing method, as set forth in claim 27, wherein said broadband, wideband, and narrowband subsystems includes redundant signal transmission planes, the method further comprising the steps of:

aligning the phases of signals on said redundant signal transmission planes; and selectively switching between said phase-aligned signals on said redundant signal transmission planes.

50. The timing method, as set forth in claim 49, wherein said redundant signal transmission planes include redundant optical links, said selectively switching step includes the step of selectively switching between said redundant optical links.

51. The timing method, as set forth in claim 39, further comprising the step of selectively switching between said phase-aligned signals.

* * * * *